United States Patent
Thomsen et al.

(10) Patent No.: US 12,448,947 B2
(45) Date of Patent: Oct. 21, 2025

(54) METHOD OF DAMPING MOTION OF A FLOATING WIND TURBINE

(71) Applicant: VESTAS WIND SYSTEMS A/S, Aarhus N (DK)

(72) Inventors: Jesper Sandberg Thomsen, Hadsten (DK); Alexander Duncan Giles, Oporto (PT); Ian Couchman, Aarhus N (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 18/699,433

(22) PCT Filed: Oct. 7, 2022

(86) PCT No.: PCT/DK2022/050208
§ 371 (c)(1),
(2) Date: Apr. 8, 2024

(87) PCT Pub. No.: WO2023/057029
PCT Pub. Date: Apr. 13, 2023

(65) Prior Publication Data
US 2024/0410333 A1     Dec. 12, 2024

(30) Foreign Application Priority Data
Oct. 8, 2021  (DK) .................................. 202170500

(51) Int. Cl.
*F03D 7/02*   (2006.01)
*F03D 13/25*  (2016.01)

(52) U.S. Cl.
CPC ......... *F03D 7/0298* (2023.08); *F03D 7/0224* (2013.01); *F03D 13/256* (2023.08);
(Continued)

(58) Field of Classification Search
None
See application file for complete search history.

(56) References Cited

U.S. PATENT DOCUMENTS 9,879,654 B2 *  1/2018  Peiffer ................... B63B 39/03
10,030,631 B2 *  7/2018  Couchman ............... F03D 9/25
(Continued)

FOREIGN PATENT DOCUMENTS

JP       6388759 B2      9/2018

OTHER PUBLICATIONS

Danish Patent and Trademark Office, 1st Technical Examination including The Search Report and Search Opinion for Application PA 2021 70500 dated Mar. 25, 2022.
(Continued)

*Primary Examiner* — Juan G Flores
(74) *Attorney, Agent, or Firm* — Patterson + Sheridan, LLP; Gero G. McClellan

(57) ABSTRACT

A method of damping motion of a wind turbine, the wind turbine comprising a rotor and a floating platform. A motion signal is generated which is indicative of a motion of the wind turbine. A wind direction signal is generated which is indicative of a wind direction relative to the floating platform. A damping signal is generated on the basis of the motion signal and the wind direction signal, and the motion of the wind turbine is damped on the basis of the damping signal, for instance by adjusting the pitch of the rotor blades. A phase of the damping signal may be controlled on the basis of the wind direction signal.

16 Claims, 4 Drawing Sheets

(52) U.S. Cl.
CPC ..... *F05B 2240/93* (2013.01); *F05B 2260/964* (2013.01); *F05B 2270/32* (2013.01); *F05B 2270/321* (2013.01); *F05B 2270/329* (2013.01)

(56) References Cited

U.S. PATENT DOCUMENTS

| | | | |
|---|---|---|---|
| 11,204,018 B2* | 12/2021 | Nielsen | B63B 21/50 |
| 2014/0339828 A1* | 11/2014 | Peiffer | B63B 43/06 |
| | | | 290/44 |
| 2015/0354532 A1 | 12/2015 | Nielsen et al. | |
| 2016/0123302 A1* | 5/2016 | Couchman | F03D 17/00 |
| | | | 416/43 |
| 2019/0203692 A1 | 7/2019 | Caponetti et al. | |
| 2019/0277255 A1* | 9/2019 | Nielsen | B63B 21/50 |

OTHER PUBLICATIONS

PCT International Search Report and Written Opinion of The International Searching Authority for Application PCT/DK2022/050208 dated Jan. 4, 2023 (Apr. 1, 2023).

* cited by examiner

METHOD OF DAMPING MOTION OF A FLOATING WIND TURBINE

FIELD OF THE INVENTION

The present invention relates to a method of damping motion of a wind turbine with a floating platform, and an associated wind turbine or wind turbine control system.

BACKGROUND OF THE INVENTION

The foundation of floating wind turbines can translate and rotate, contrary to their fixed foundation offshore counterparts.

When these motions result in changes to apparent wind speed observed by the rotor (i.e. the motions are into/out of the wind), there is a coupling between the motions and the aerodynamic torque. When the wind turbine is in a full load operating region, this dynamic coupling creates a problem because the collective pitch reference is used to control the speed of the generator in this region. As changing the collective pitch reference also changes the rotor thrust (and hence promotes motion), there is a risk that the following loop occurs: the wind turbine moves into the wind increasing aerodynamic torque and generator speed; the pitch controller collectively pitches the blades to reduce the generator speed; this pitching also reduces the thrust; this reduction in thrust causes the wind turbine to move forwards more amplifying the effect. The converse cycle is true when the wind turbine moves backwards. Consequently, controlling the generator speed in the range of the natural periods of the substructure can lead to a negative damping effect.

U.S. Pat. No. 10,030,631 discloses methods and apparatus for removing or substantially reducing negative damping effects on a floating wind turbine. An operating point signal is received and a gain scheduling parameter is determined based on the received operating point signal. An input signal is then gain scheduled by the gain scheduling parameter and based on at least the gain scheduled input signal the negative damping effects on a floating wind turbine can be removed or substantially reduced.

SUMMARY OF THE INVENTION

A first aspect of the invention provides a method of damping motion of a wind turbine, the wind turbine comprising a rotor and a floating platform, the method comprising: generating a motion signal which is indicative of a motion of the wind turbine; generating a wind direction signal which is indicative of a wind direction relative to the floating platform; generating a damping signal on the basis of the motion signal and the wind direction signal; and damping the motion of the wind turbine on the basis of the damping signal.

Optionally a phase or amplitude of the damping signal is controlled on the basis of the wind direction signal.

Optionally a phase of the damping signal is controlled on the basis of the wind direction signal.

Optionally the method further comprises filtering the motion signal with a filter with a cut-off frequency, wherein the phase of the damping signal is controlled by modifying the cut-off frequency.

Optionally an amplitude of the damping signal is controlled on the basis of the wind direction signal.

Optionally generating the damping signal comprises determining a gain scheduling parameter on the basis of the wind direction signal; and modifying the motion signal on the basis of the gain scheduling parameter.

Optionally the motion signal is indicative of an acceleration or velocity of the wind turbine.

Optionally the rotor has a blade pitch angle, and the motion of the wind turbine is damped by controlling the blade pitch angle.

Optionally the rotor has a rotor axis which lies in a vertical plane, and the motion of the wind turbine is a fore-aft motion in the vertical plane.

Optionally generating the motion signal comprises measuring the motion of the wind turbine with one or more motion sensors.

Optionally generating the wind direction signal comprises: determining a yaw angle of the rotor relative to the floating platform; measuring a relative wind direction with a wind sensor, wherein the relative wind direction is indicative of a wind direction relative to the rotor; and generating the wind direction signal on the basis of the yaw angle and the relative wind direction.

Optionally the rotor is carried by a nacelle, and the motion signal is indicative of a motion of the nacelle or a motion of the floating platform.

Optionally the method further comprises generating a wind speed signal which is indicative of a wind speed incident on the wind turbine; and generating the damping signal on the basis of the wind speed signal.

Optionally the method further comprises generating a wind speed signal which is indicative of a wind speed incident on the wind turbine, or generating a pitch signal which is indicative of a pitch of a blade of the rotor; and generating the damping signal on the basis of the wind speed signal or the pitch signal.

Optionally the rotor is carried by a substructure, the substructure comprises the floating platform and a tower, and the substructure has a dynamic response to wind loads which varies depending on the wind direction.

Optionally the rotor is carried by a tower with a vertical tower axis, the floating platform has a geometric centre, and the vertical tower axis is offset from the geometric centre of the platform.

Optionally the rotor is carried by a substructure, the substructure comprises the floating platform and a vertical tower axis, the substructure has a vertical yaw axis, and the vertical tower axis is offset from the vertical yaw axis.

Optionally the floating platform has a non-circular profile when viewed from above.

A second aspect of the invention provides a wind turbine control system configured to perform the method of the first aspect of the invention, wherein the wind turbine control system is configured: to receive a motion signal which is indicative of a motion of the wind turbine; receive a wind direction signal which is indicative of a wind direction relative to the floating platform; generate a damping signal on the basis of the motion signal and the wind direction signal; and damp the motion of the wind turbine on the basis of the damping signal.

A further aspect of the invention provides a wind turbine comprising a rotor; a floating platform; and a wind control system according to the second aspect of the invention.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
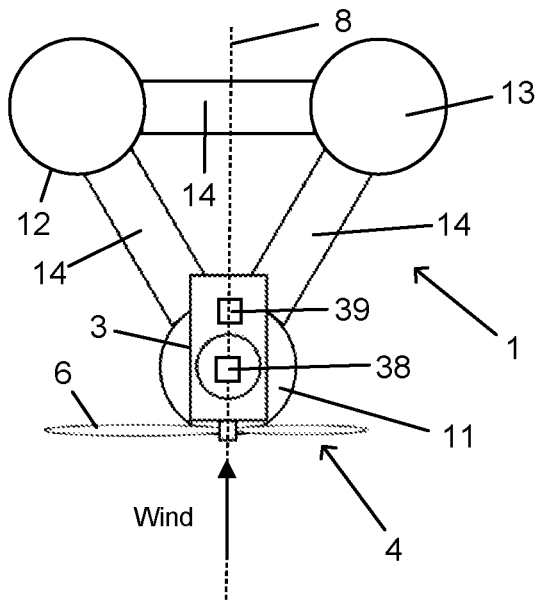
FIG. 1 is a plan view of a wind turbine with a 0 degree wind direction.
Figure 2:
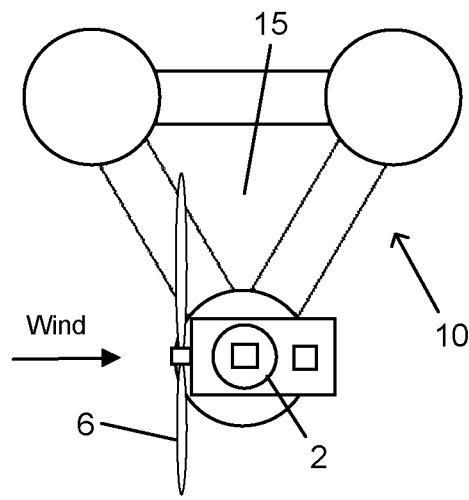
FIG. 2 is a plan view of the wind turbine with a 90 degree wind direction.
Figure 3:
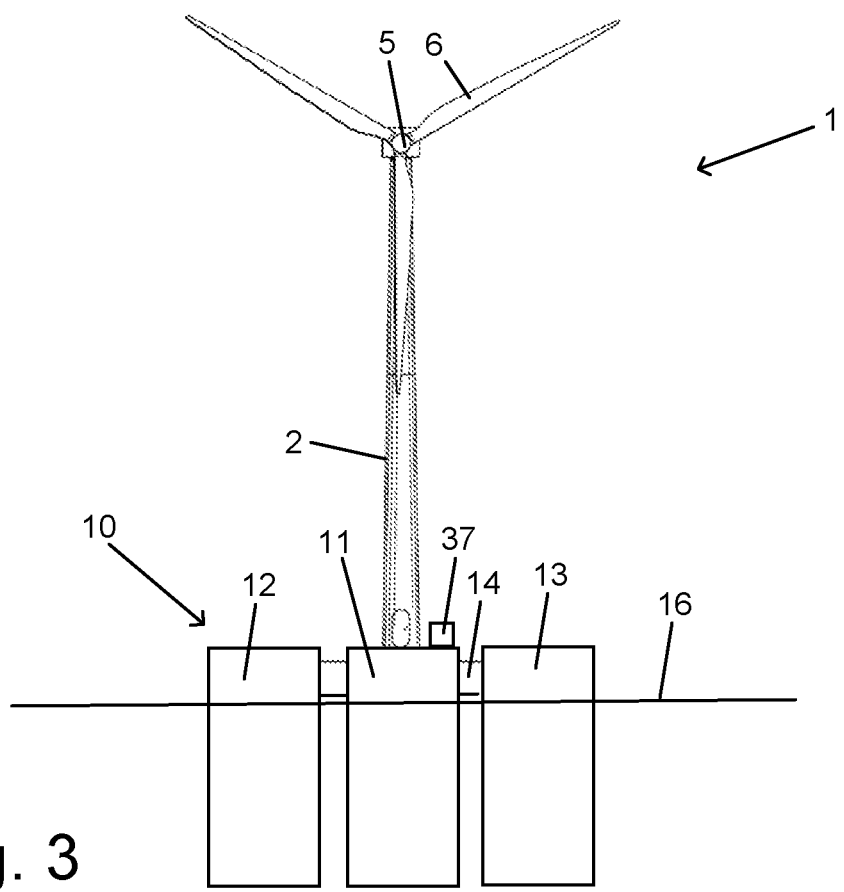
FIG. 3 is a side of the wind turbine with a 0 degree wind direction.

FIGS. 1-3 show a wind turbine 1. The wind turbine 1 includes a tower 2 carried by a platform 10, a nacelle 3 at the top of the tower, and a rotor 4 operatively coupled to a generator housed inside the nacelle 3.

In addition to the generator, the nacelle 3 houses miscellaneous components required for converting wind energy into electrical energy and various components needed to operate, control, and optimize the performance of the wind turbine 1. The rotor 4 of the wind turbine includes a central hub 5 and a plurality of blades 6 that project outwardly from the central hub 5. Typically, the rotor 4 includes three blades 6, but the number may vary.

The platform 10 is a floating platform which is tethered to the seabed by a tether system (not shown). The platform 10 comprises three floats 11-13 connected by support struts 14. As shown in FIG. 3, the floats 11-13 are semi-submerged in water 16. The tower 2 and platform 10 are collectively referred to below as the substructure of the wind turbine.

The resonant periods of the substructure whole body modes for the wind turbine 1 may be as follows: for tilt (i.e. the rotation of the substructure such that the nacelle moves into/out of the wind) it can be of the order of 18-30 seconds depending on the design; for surge (i.e. the translation of the substructure such that the nacelle moves into/out of the wind) it can be of the order of 50-100 s depending on the design and the operating point; and for yaw (i.e. rotation of the substructure about a vertical yaw axis) it can be 80 s-150 s depending on the design and the operating point.

The rotor has a rotor axis which lies in a vertical plane 8 indicated in FIG. 1. The tether system permits a certain degree of motion of the wind turbine—both fore-aft motion in the vertical plane 8 and side-to-side motion perpendicular to the vertical plane 8. As explained above, motion in the fore-aft direction can lead to a negative damping effect.

As shown in FIGS. 1 and 2, the floats 11-13 may be arranged in an equilateral triangle, around an axis of rotational symmetry which in this case passes through the geometric centre of the platform 10. In other embodiments, the platform 10 may have four floats arranged in a square, or more than four floats. In these examples the floats are arranged in a shape with rotational symmetry of three or more (for example an equilateral triangle or a square). In other embodiments the platform 10 may have multiple floats arranged in a shape with higher or lower rotational symmetry, or with no rotational symmetry.

The tower 2 may be carried by one of the floats, in this case the float 11. Alternatively the tower 2 may be carried by some other part of the platform 10, for instance at the geometric centre of the platform 10. In an embodiment, more than one tower may be carried by the platform.

The platform 10 has a so-called "semi-submersible" design, with multiple floats, but other types of floating platform may be used, for example a so-called "barge" design, or a so-called "spar" design. A spar design may have a single elongated float, with a majority of the spar submerged and the tower mounted in line with the vertical axis of the spar. A barge design may have a single float in the form of a barge, with a majority of the barge above the water line. The barge may have a square profile with the tower offset from a geometric centre or centre of buoyancy of the barge. In an embodiment the platform 10 may have a non-circular shape comprising one or more floats. A non-circular platform comprising one float may be a spar-type platform with a non-circular cross-section at least for a substantial extent along the vertical axis, such that the non-circular cross-section part result in a dynamic response to wind loads which varies depending on the wind direction.

The nacelle 3 can rotate relative to the tower 2 and the platform 10, in order to point into the wind. Thus, with a 0 degrees wind direction, the nacelle 3 and rotor 4 point as shown in FIG. 1; and with a 90 degree wind direction, the nacelle 3 and rotor 4 point as shown in FIG. 2.

In an embodiment the platform may have a shape with a dynamic response to wind loads which varies depending on the wind direction, e.g. from a non-circular profile, the arrangement of the float or the arrangement of other features of the substructure.

Figure 4:
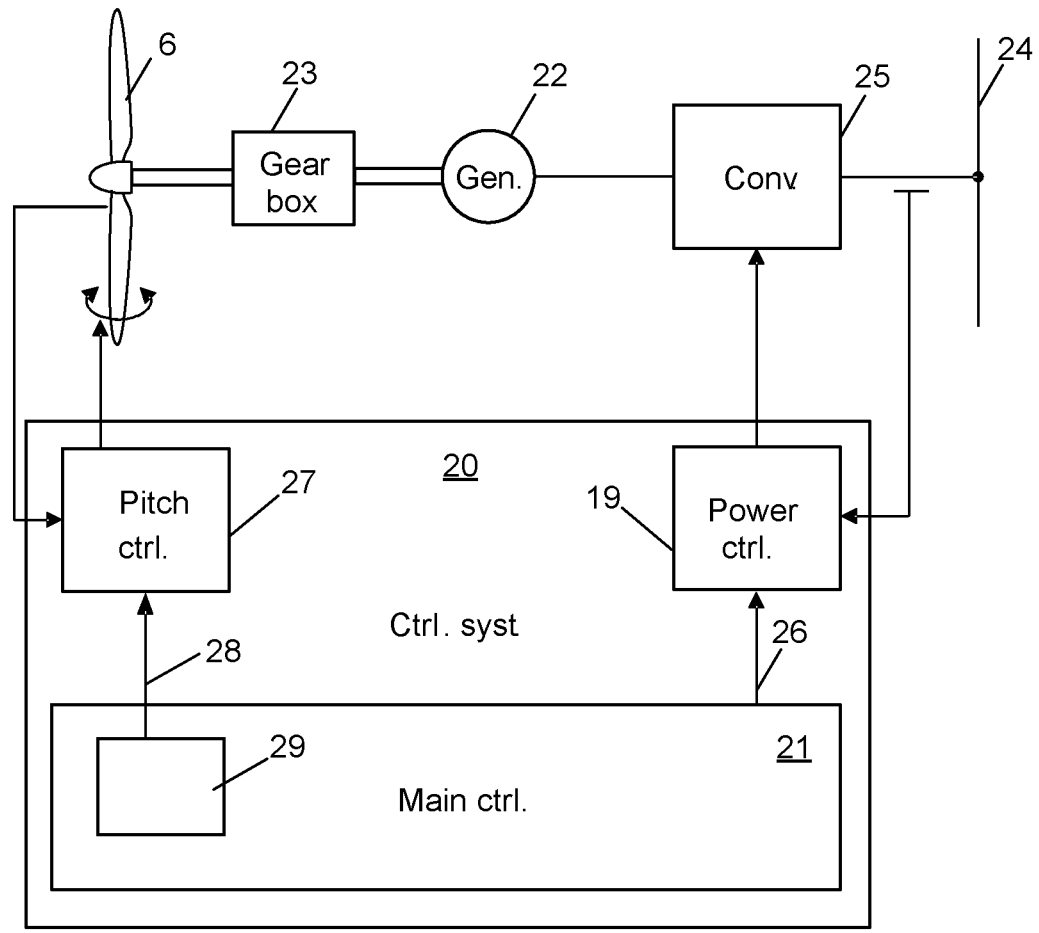
FIG. 4 is a schematic view of a wind turbine control system configured to control the wind turbine.

FIG. 4 schematically illustrates an embodiment of a wind turbine control system 20 configured to control the wind turbine 1. The control system 20 may be placed inside the nacelle 3 and/or distributed at a number of locations inside the turbine. Optionally some, or all, elements of the control system 20 may be placed in a remote power plant controller (not shown).

The blades 6 are mechanically connected to an electrical generator 22 via a gearbox 23. In direct drive systems, and other systems, the gearbox 23 may not be present. The electrical power generated by the generator 22 is injected into a power grid 24 via an electrical converter 25. The electrical generator 22 and the converter 25 may be based on a full scale converter (FSC) architecture or a doubly fed induction generator (DFIG) architecture, but other types may be used.

The control system 20 comprises a number of elements, including at least one main controller 21. In general, the control system 20 ensures that in operation the wind turbine 1 generates a requested power output level. This is obtained by adjusting the pitch angle of the blades 6 and/or the power extraction of the converter 25. To this end, the control system comprises a pitch system including a motion control system 29 for generating a pitch reference 28 which is input to a pitch controller 27; and a power system including a power controller 19 using a power reference 26. The rotor blades 6 can be pitched by a pitch mechanism under the control of the pitch controller 27. The rotor 4 may comprise an individual pitch system which is capable of individual pitching of the rotor blades 6, or it may comprise a common pitch system which adjusts all pitch angles on all rotor blades 6 at the same time. In the case of a common pitch system, the pitch reference 28 is known as a collective pitch reference.

Figure 5:
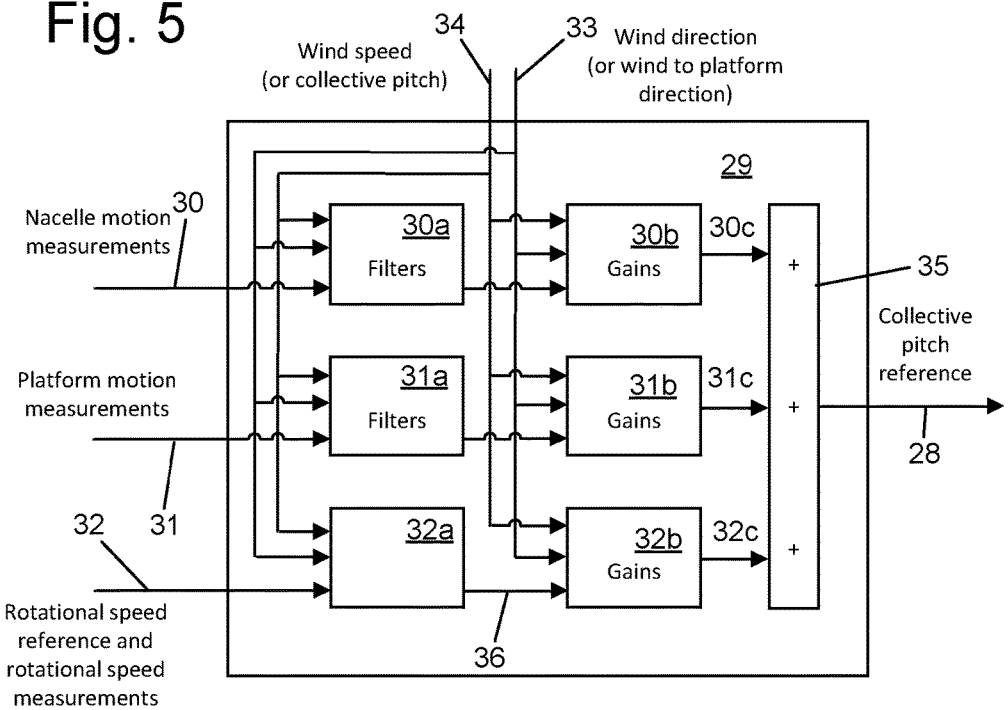
FIG. 5 shows a first embodiment of a motion control system.

A first embodiment of the motion control system 29 is shown in FIG. 5. The motion control system 29 controls rotational speed of the rotor 4, and also provides a fore-aft substructure damping (FASD) function which controls motion of the substructure (the tower 2 and the platform 10).

The substructure 2, 10 has a dynamic response to wind loads which varies depending on the wind direction. As shown in FIG. 2, the vertical axis of the tower 2 is offset from the geometric centre 15 of the platform 10, and also offset from the vertical yaw axis of the substructure 2, 10. So when the wind direction is 90 degrees as in FIG. 2, changes in aerodynamic thrust will result in yaw motions of the substructure 2, 10; whilst when the wind direction is 0 degrees as in FIG. 1, it will not.

This change in dynamic response could create a problem for a fore-aft substructure damping (FASD) system because such a FASD system would need to be tuned to be a compromise between performance in the two wind directions. As a result, large generator speed oscillations and/or platform tilt/roll/yaw oscillations may be observed. The motion control system 29 provides an improved FASD function which is designed to avoid such a compromise.

As shown in FIG. 5, the motion control system 29 is configured to receive motion signals 30, 31 which are indicative of a motion of the wind turbine 1. The motion control system 29 is also configured to receive a wind direction signal 33 which is indicative of a wind direction relative to the floating platform. As explained below, the motion control system 29 is also configured to generate damping signals 30c, 31c on the basis of the motion signals 30, 31 and the wind direction signal 33.

Essentially all nacelle motion states, all platform motion states, and the rotational speed are used as inputs into the motion control system 29. In this example the inputs include: a nacelle motion signal 30 (indicative of translational and rotational motion of the nacelle 3); a platform motion signal 31 (indicative of translational and rotational motion of the platform 10); and rotational speed data 32 (which may include a rotational speed signal indicative of rotational speed of the generator 22 or the rotor 4, and a rotational speed reference).

The nacelle motion signal 30 may be generated by direct measurements obtained from one or more motion sensors 38 (shown in FIG. 1) carried by the nacelle 3, or by estimates obtained by other means. By way of example, the nacelle motion signal 30 may be indicative of a velocity or acceleration of the nacelle 3.

The platform motion signal 31 may be generated by direct measurements obtained from one or more motion sensors 37 (shown in FIG. 3) carried by the platform 10, or by estimates obtained by other means. By way of example, the platform motion signal 31 may be indicative of a velocity or acceleration of the platform 10.

The rotational speed signal, which forms part of the rotational speed data 32, may be generated by direct measurements obtained from one or more motion sensors (not shown) carried by the wind turbine, or by estimates obtained by other means.

The inputs 30, 31 may each be filtered (high pass, low pass, notch filtering) by a respective filter 30a, 31a, and a gain may be applied to the output of each filter by a respective gain function 30b, 31b.

The rotational speed data 32 may be input to a function 32a which may output a rotor speed error signal 36 based on a difference between the rotor speed and the speed reference. A gain 32b may be applied to the rotor speed error signal 36 by a gain function 32b.

Each filter 30a, 31a; function 32a; and gain function 30c, 31b, 32c may be modified as a function of the wind direction indicated by a wind direction signal 33. The wind direction signal 33 may be indicative of a wind direction relative to the floating platform 10.

In one example the wind direction signal 33 may be generated by: determining a yaw angle of the rotor 4 relative to the floating platform 10; measuring a relative wind direction with a wind direction sensor 39 shown in FIGS. 1 and 2 carried by the nacelle 3 (the relative wind direction being indicative of a wind direction relative to the rotor 4) and generating the wind direction signal 33 on the basis of the yaw angle and the relative wind direction. The relative wind direction accounts for the fact that the yaw control system may not precisely orient the rotor 4 so that it is pointing into the wind.

In another example the wind direction signal 33 may be generated solely on the basis of the yaw angle of the rotor 4 relative to the floating platform 10.

In another example the wind direction signal 33 may be generated by a wind direction sensor (not shown) carried by the tower 2 or platform 10, so that the wind direction sensor does not rotate with the nacelle 3.

Each filter 30a, 31a; function 32a; and gain function 30b, 31b, 32b may also be modified as a function of the wind speed indicated by a wind speed signal 34. The wind speed signal 34 may be indicative of a wind speed incident on the wind turbine. The wind speed signal 34 may be generated by a wind speed sensor (not shown) carried by the nacelle 3 or the tower 2, or it may be a wind speed estimate obtained by other means.

Optionally the wind speed signal 34 may be replaced by a collective pitch signal, indicating a collective pitch angle of the blades 6.

The output of each of the gain functions 30b, 31b is a respective gain-scheduled damping signal. More specifically, the gain function 30b outputs a gain-scheduled nacelle motion damping signal 30c and the gain function 31b outputs a gain-scheduled platform motion damping signal 31c.

The output of the gain function 32b may be a pitch contribution signal 32c which may be calculated as the rotor speed error multiplied with a gain.

Alternatively, the pitch contribution signal 32c may not just be the product of an error term and a gain, as would be the case in a "Proportional" controller. In other cases, there may be an integral term. In other cases still, there may not be a proportional-integral action, but an alternative such as a lead-lag compensator, or some non-linear control element.

The pitch contribution signal 32c, and the gain-scheduled damping signals 30c, 31c, are input into a controller 35, such as a sum-block, which generates the collective pitch reference 28 on the basis of these inputs.

Figure 6:
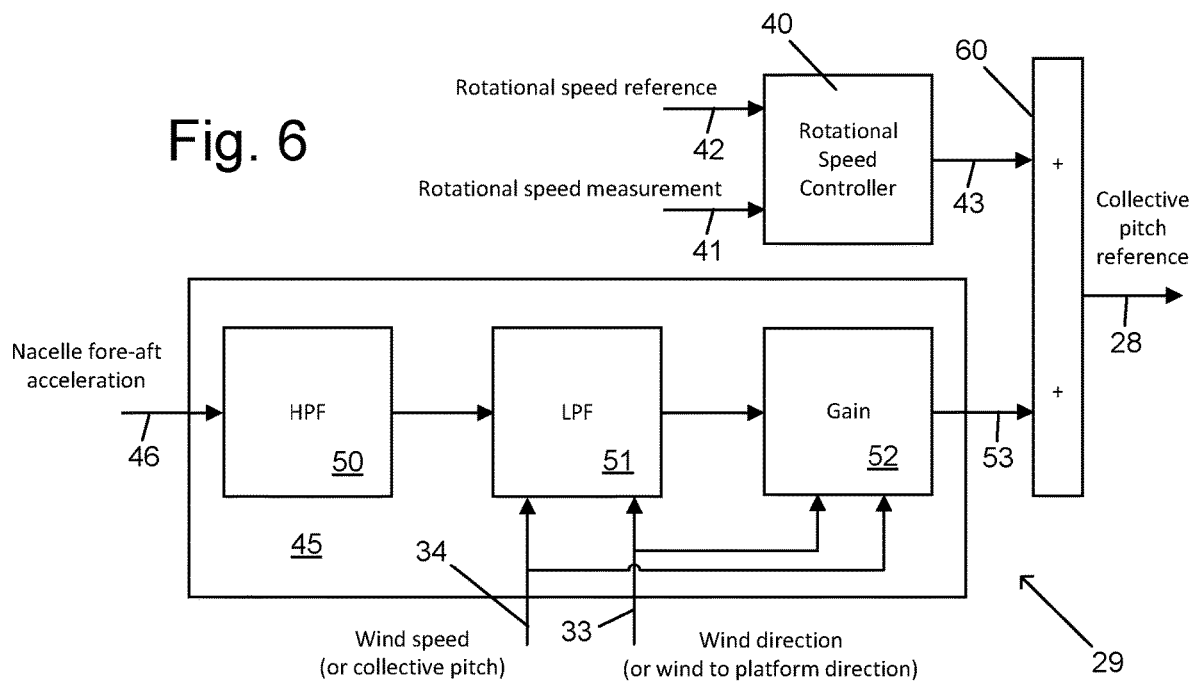
FIG. 6 shows a second embodiment of a motion control system.

A second embodiment of the motion control system 29 is shown in FIG. 6. The embodiment of FIG. 6 is a specific example or subset of the more generic embodiment of FIG. 5.

A rotational speed controller 40 receives two inputs: a rotational speed signal 41 indicative of rotational speed of the generator 22 or the rotor 4, and a rotational speed reference 42. The rotational speed signal 41 may be generated by direct measurements obtained from one or more motion sensors carried by the wind turbine, or by estimates obtained by other means.

The rotational speed controller 40, which corresponds with the function 32a of FIG. 5, generates a pitch contribution signal 43. By way of example, the rotational speed controller 40 may be a proportional-integral (PI) controller.

A platform motion control system 45 receives a nacelle fore-aft acceleration signal 46, indicative of translational acceleration of the nacelle 3 in the fore-aft direction. The nacelle fore-aft acceleration signal 46 may be generated by direct measurements obtained from one or more accelerometers carried by the nacelle 3, or by estimates obtained by other means.

The nacelle fore-aft acceleration signal 46 is filtered by a high pass filter 50 to remove the effect of gravity, and by a low pass filter 51 to provide the correct phase.

A cut-off frequency (3 dB point) of the low pass filter 51 is modified by a gain scheduling parameter which varies as a function of the wind direction indicated by the wind direction signal 33. The wind direction signal 33 was described above and will not described again.

A gain is applied to the output of the low pass filter 51 by a gain function 52. The gain function 52 is also modified by a gain scheduling parameter which varies as a function of the wind direction indicated by the wind direction signal 33.

The low pass filter 51 and the gain function 52 may also be modified by a gain scheduling parameter which varies as a function of the wind speed indicated by the wind speed signal 34, or as a function of a collective pitch signal.

Thus the gain applied by the gain function 52 may be dependent on wind speed and wind direction, the applied gain varying on the basis of a gain scheduling parameter. The gain scheduling parameter for the gain function 52 may vary in a predetermined way based on the signals 33, 34. Since changing the phase will also cause the gain to change, then the gain scheduling parameter of the gain function 52 may need to be adjusted on the basis of the phase.

The output of the gain function 52 is a gain-scheduled damping signal 53.

The gain-scheduled damping signal 53, and the pitch contribution signal 43, are input into a controller 60, such as a sum-block. The controller 60 generates the collective pitch reference 28 on the basis of the gain-scheduled damping signal 53, and the pitch contribution signal 43.

The rotational speed controller 40 is responsible for the dominant component of the overall collective pitch reference 28; this is because the rotational speed controller 40 must take care of the rotor power to generator power balance to avoid speed increases and decreases, and thus the average pitch value must be set. In this way, the collective pitch reference 28 can be considered as an offset to a collective pitch reference produced by the rotational speed controller 40.

The embodiment of FIG. 6 generates a gain-scheduled damping signal 53 on the basis of a nacelle fore-aft acceleration signal 46, a wind direction signal 33 and a wind speed signal 34. The motion of the wind turbine 1 is damped on the basis of this gain-scheduled damping signal 53, providing a fore-aft substructure damping (FASD) function.

A cut-off frequency (3 dB point) of the low pass filter 51 (and hence the phase of the gain-scheduled damping signal 53) is controlled on the basis of the wind direction signal 33 and the wind speed signal 34. Therefore the FASD function is tuned to a particular phase, which varies on the basis of the wind direction signal 33 and the wind speed signal 34.

In FIGS. 5 and 6, the phase of each damping signal 30c, 31c, 53 is controlled by modifying the cut-off frequency, but in other embodiments the phase may be controlled in some other way. One alternative is to synthesise an orthogonal component to some original component of interest, rotate that vector, and then take the rotated form of the original component of interest.

In FIGS. 5 and 6, both the phase and the amplitude of the damping signal 30c, 31c, 53 are controlled on the basis of the wind direction signal 33. That is, the phase is controlled by the adjustment of a low pass filter, and the amplitude is controlled by the adjustment of a gain function. In an alternative embodiment, only the phase or only the amplitude may be controlled on the basis of the wind direction signal 33.

Unlike the first embodiment of FIG. 5, there are no platform motion measurements in the embodiment of FIG. 6. Instead of all the nacelle and platform motion states, only the nacelle acceleration is used. This is not a bad indicator of the platform motion as the tower 2 is rather stiff. By application of the wind speed scheduling and the wind direction scheduling on the low pass filter 51 (affecting the phase), the motion control system 29 of FIG. 6 provides a joint controller—by joint means that the platform motion and rotational system are tuned as one system.

Figure 7:
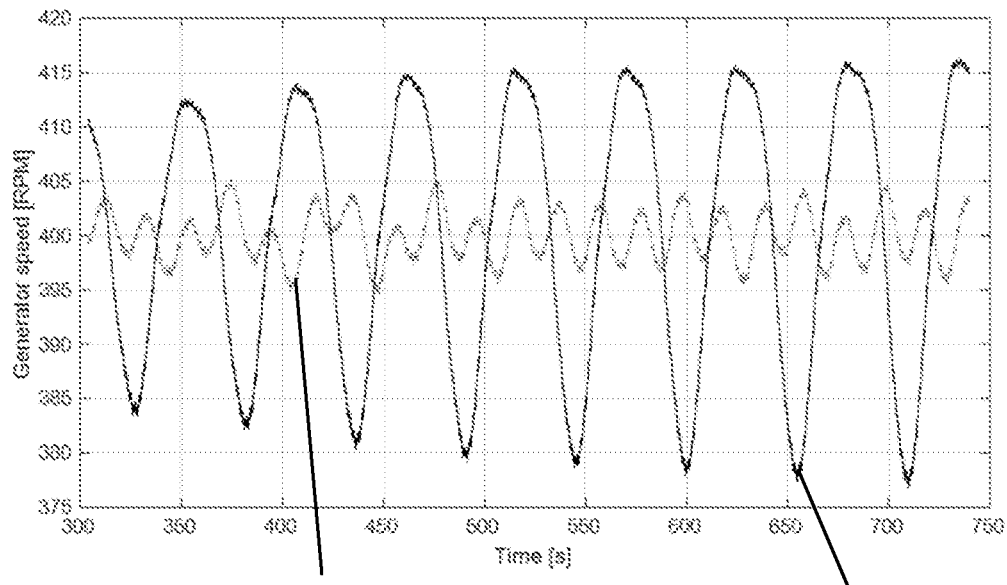
FIG. 7 shows oscillations of the speed of the generator with a fore-aft substructure damping (FASD) function tuned to provide −28 degrees of phase shift.

FIG. 7 shows two time traces 70, 71, each showing the oscillation of the speed of the generator 22 over a 450 second time period. The time trace 70 corresponds with the 0 degrees wind direction of FIG. 1 (in which the thrust force is aligned with the vertical yaw axis of the substructure), and the time trace 71 corresponds with the 90 degrees wind direction of FIG. 2 (in which the thrust force is not aligned with the vertical yaw axis of the substructure).

The time traces 70, 71 of FIG. 7 are generated with a fore-aft substructure damping (FASD) function tuned to provide −28 degrees of phase shift. Time trace 70 shows that that the generator speed is kept within 4 RPM of the nominal speed, 400 RPM, when the wind direction is 0 degrees (as in FIG. 1). However, when the wind direction is 90 degrees, time trace 71 shows that there is a powerful low frequency term present in the generator speed, producing significant deviations from the nominal generator speed.

Figure 8:
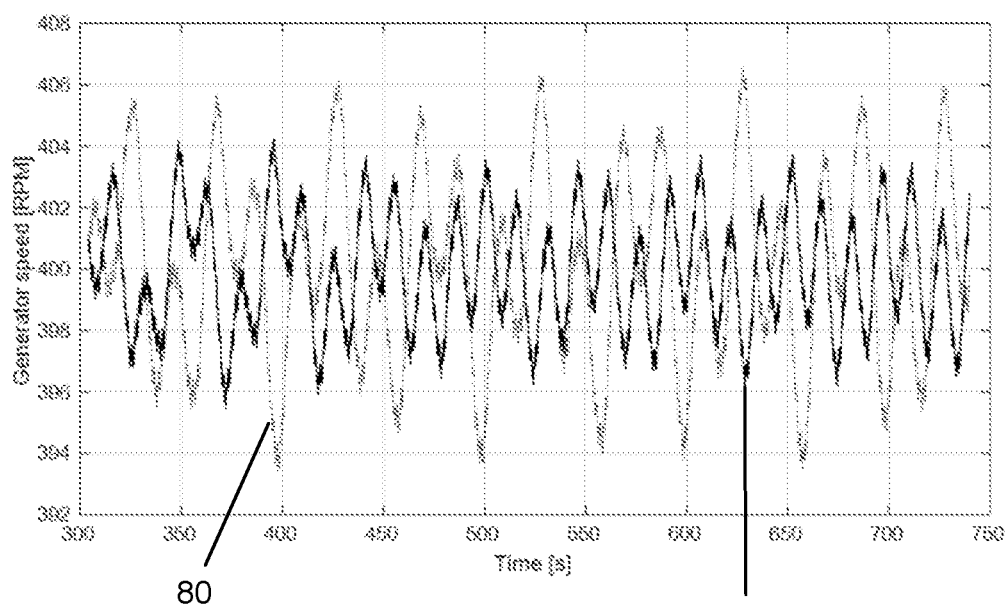
FIG. 8 shows oscillations of the speed of the generator with fore-aft substructure damping (FASD) function tuned to provide −77 degrees of phase shift

FIG. 8 shows an FASD function tuned to provide −77 degrees of phase shift. Time trace 80 corresponds with the 0 degrees wind direction of FIG. 1 (in which the thrust force is aligned with the vertical yaw axis of the substructure), and time trace 81 corresponds with the 90 degrees wind direction of FIG. 2 (in which the thrust force is not aligned with the vertical yaw axis of the substructure).

It can be seen from FIG. 8 that the generator speed standard deviation is larger when the prevailing wind direction is 0 degrees (time trace 80) than it is when the wind direction is 90 degrees (time trace curve 81).

Further, by comparing FIGS. 7 and 8 it can be seen that the generator speed oscillation in the 0 degree case is higher when the phase shift is −77 degrees (trace 80, FIG. 8) than it is when it is −28 degrees (trace 70, FIG. 7).

Further, by comparing FIGS. 7 and 8 it can be seen that the generator speed oscillation in the 90 degree case is lower when the phase shift is −77 degrees (trace 81, FIG. 8) than it is when it is −28 degrees (trace 71, FIG. 7).

FIGS. 7 and 8 therefore show that an improved FASD performance can be achieved by tuning the FASD function to provide −28 degrees of phase shift when the wind direction is 0 degrees (as in FIG. 1); and tuning the FASD to provide −77 degrees of phase shift when the wind direction is 90 degrees (as in FIG. 2).

In the embodiments above, the motion of the wind turbine is damped by controlling the collective blade pitch angle on the basis of the damping signal. In other embodiments, damping may be performed by other means such as active dampers in the platform 10 or tower 2.

In the embodiments above, each damping signal 30c, 31c, 53 is generated on the basis of a fore-aft motion signal 30, 31, 46, in order to provide an FASD function. In alternative embodiments, equivalent damping signals may be generated on the basis of side-to-side motion signals, to provide a side-to-side damping function.

In the embodiments above, each motion signal 30, 31, 46 is indicative of a motion of the nacelle 3 or a motion of the floating platform 10. In other embodiments, the motion signal may be indicative of a motion of some other part of the wind turbine, such as the tower 2.

Although the invention has been described above with reference to one or more preferred embodiments, it will be appreciated that various changes or modifications may be made without departing from the scope of the invention as defined in the appended claims.

The invention claimed is:

1. A method of damping motion of a wind turbine, the wind turbine comprising a rotor with a blade pitch angle and a floating platform, the method comprising:
    generating a motion signal which is indicative of a motion of the wind turbine;
    generating a wind direction signal which is indicative of a wind direction relative to the floating platform;
    generating a damping signal on the basis of the motion signal and the wind direction signal; and
    damping the motion of the wind turbine on the basis of the damping signal by controlling the blade pitch angle,
    wherein a phase or amplitude of the damping signal is controlled on the basis of the wind direction signal, and
    wherein generating the wind direction signal comprises: determining a yaw angle of the rotor relative to the floating platform; measuring a relative wind direction with a wind sensor, wherein the relative wind direction is indicative of a wind direction relative to the rotor; and generating the wind direction signal on the basis of the yaw angle and the relative wind direction.

2. The method according to claim 1, further comprising filtering the motion signal with a filter with a cut-off frequency, wherein the phase of the damping signal is controlled by modifying the cut-off frequency.

3. The method according to claim 1, wherein an amplitude of the damping signal is controlled on the basis of the wind direction signal.

4. The method according to claim 1, wherein generating the damping signal comprises determining a gain scheduling parameter on the basis of the wind direction signal; and modifying the damping signal on the basis of the gain scheduling parameter.

5. The method according to claim 1, wherein the motion signal is indicative of an acceleration or velocity of the wind turbine.

6. The method according to claim 1, wherein the rotor has a rotor axis which lies in a vertical plane, and the motion of the wind turbine is a fore-aft motion in the vertical plane.

7. The method according to claim 1, further comprising generating a wind speed signal which is indicative of a wind speed incident on the wind turbine; and generating the damping signal on the basis of the wind speed signal.

8. The method according to claim 1, further comprising generating a wind speed signal which is indicative of a wind speed incident on the wind turbine, or generating a pitch signal which is indicative of a pitch of a blade of the rotor; and generating the damping signal on the basis of the wind speed signal or the pitch signal.

9. The method according to claim 1, wherein the rotor is carried by a substructure, the substructure comprises the floating platform and a tower, and the substructure has a dynamic response to wind loads which varies depending on the wind direction.

10. The method according to claim 1, wherein the rotor is carried by a tower with a vertical tower axis, the floating platform has a geometric centre, and the vertical tower axis is offset from the geometric centre of the floating platform.

11. The method according to claim 1, wherein the rotor is carried by a substructure, the substructure comprises the floating platform and a vertical tower axis, the substructure has a vertical yaw axis, and the vertical tower axis is offset from the vertical yaw axis.

12. The method according to claim 1, wherein the floating platform has a non-circular profile when viewed from above.

13. A wind turbine control system, comprising:
    an input/output (I/O) interface; and
    at least one processor communicatively coupled to the I/O interface and configured to perform an operation, comprising:
        receiving, via the I/O interface, a motion signal indicative of a motion of a wind turbine;
        receive, via the I/O interface, a wind direction signal indicative of a wind direction relative to a floating platform of the wind turbine;
        generating a damping signal on the basis of the motion signal and the wind direction signal by controlling a blade pitch angle of a rotor of the wind turbine; and
        damping the motion of the wind turbine on the basis of the damping signal, wherein a phase or amplitude of the damping signal is controlled on the basis of the wind direction signal, and
        wherein generating the wind direction signal comprises: determining a yaw angle of the rotor relative to the floating platform; measuring a relative wind direction with a wind sensor, wherein the relative wind direction is indicative of a wind direction relative to the rotor; and generating the wind direction signal on the basis of the yaw angle and the relative wind direction.

14. The wind turbine control system according to claim 13, further comprising filtering the motion signal with a filter with a cut-off frequency, wherein the phase of the damping signal is controlled by modifying the cut-off frequency.

15. The wind turbine control system according to claim 13, wherein an amplitude of the damping signal is controlled on the basis of the wind direction signal.

16. A wind turbine, comprising:
    a rotor with a blade pitch angle;
    a floating platform; and
    a wind control system configured to perform an operation, comprising:
        receiving a motion signal indicative of a motion of a wind turbine;
        receive a wind direction signal indicative of a wind direction relative to the floating platform;
        generating a damping signal on the basis of the motion signal and the wind direction signal; and
        damping the motion of the wind turbine on the basis of the damping signal by controlling the blade pitch angle,
        wherein a phase or amplitude of the damping signal is controlled on the basis of the wind direction signal, and
        wherein generating the wind direction signal comprises: determining a yaw angle of the rotor relative to the floating platform; measuring a relative wind direction with a wind sensor, wherein the relative wind direction is indicative of a wind direction relative to the rotor; and generating the wind direction signal on the basis of the yaw angle and the relative wind direction.

\* \* \* \* \*